(12) United States Patent
Choi

(10) Patent No.: US 9,311,758 B2
(45) Date of Patent: Apr. 12, 2016

(54) VEHICLE CONTROL DEVICE AND METHOD

(71) Applicant: LSIS CO., LTD., Anyang-si, Gyeonggi-do (KR)

(72) Inventor: Moon Shik Choi, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/326,187

(22) Filed: Jul. 8, 2014

(65) Prior Publication Data

US 2015/0025733 A1 Jan. 22, 2015

(30) Foreign Application Priority Data

Jul. 22, 2013 (KR) .................. 10-2013-0086238

(51) Int. Cl.
*G06F 19/00* (2011.01)
*G07C 5/00* (2006.01)
*H04W 4/04* (2009.01)

(52) U.S. Cl.
CPC .............. *G07C 5/008* (2013.01); *H04W 4/046* (2013.01)

(58) Field of Classification Search
CPC .......... B60R 16/03; G06F 1/26; G06F 1/266; G06F 7/76; G06F 19/00; G07C 5/0866
USPC ................ 701/29.3, 482; 370/237, 331, 338; 455/433, 524; 714/6.23, 6.3, 6.32
See application file for complete search history.

(56) References Cited

U.S. PATENT DOCUMENTS

| | | | |
|---|---|---|---|
| 5,825,759 A * | 10/1998 | Liu ........................ | H04W 8/06 370/331 |
| 8,582,579 B2 * | 11/2013 | Yousefi et al. ........... | 370/395.42 |
| 8,804,734 B2 * | 8/2014 | Yousefi et al. ............ | 370/392 |
| 8,903,593 B1 * | 12/2014 | Addepalli et al. ........ | 701/29.1 |
| 8,918,251 B2 * | 12/2014 | Tarnutzer et al. ......... | 701/36 |
| 2004/0204828 A1 * | 10/2004 | Ebi .............................. | 701/201 |
| 2006/0101311 A1 * | 5/2006 | Lipscomb et al. ......... | 714/47 |

(Continued)

FOREIGN PATENT DOCUMENTS

| | | |
|---|---|---|
| CN | 102529903 | 7/2012 |
| CN | 102857411 | 1/2013 |

(Continued)

OTHER PUBLICATIONS

Baohua et al., The Rapid Development of Hybrid ISG Control System by on-line Debugging System, 2005, IEEE, p. 305-310.*

(Continued)

*Primary Examiner* — McDieunel Marc
(74) *Attorney, Agent, or Firm* — Lee Hong Degerman Kang & Waimey; Jonathan Kang; Jeffrey Lotspeich

(57) ABSTRACT

A vehicle control method according to an embodiments includes: collecting data in a first communication data format from at least one electronic unit in a vehicle; converting the data collected in the first communication data format into a second communication data format in order to be transmitted to a pre-connected destination; transmitting the converted data to the destination; receiving, from the destination, control data of the second communication data format corresponding to the transmitted data; converting the control data of the second communication data format into the first communication data format; and outputting the control data of the first communication data format to a corresponding electronic unit.

12 Claims, 3 Drawing Sheets

(56) References Cited

U.S. PATENT DOCUMENTS

| | | | |
|---|---|---|---|
| 2008/0215208 A1* | 9/2008 | Carlson | 701/35 |
| 2012/0106537 A1* | 5/2012 | Yousefi et al. | 370/350 |
| 2012/0106550 A1* | 5/2012 | Yousefi et al. | 370/392 |
| 2012/0109447 A1* | 5/2012 | Yousefi et al. | 701/32.2 |
| 2012/0173900 A1* | 7/2012 | Diab et al. | 713/310 |
| 2014/0071828 A1* | 3/2014 | Wang | H04L 12/1881 370/237 |
| 2014/0207309 A1* | 7/2014 | Armitage et al. | 701/1 |
| 2014/0229061 A1* | 8/2014 | Tarnutzer et al. | 701/36 |

FOREIGN PATENT DOCUMENTS

| | | |
|---|---|---|
| JP | 2012-176654 | 9/2012 |
| WO | 2012/143073 | 10/2012 |

OTHER PUBLICATIONS

Enriquez et al., CANOPNR: CAN-OBD Programmable-expandable Network-enabled Reader for Real-time Tracking of Slippery Road Conditions using Vehicular Parameters*, 2012, IEEE, p. 260-264.*

Stojcsics et al. Improvement methods of short range and low bandwidth communication for small range UAVs, 2010, IEEE. p. 93-97.*

Chen et al. Design and Implementation of a Location Awareness System for Field Police Work, 2009, p. 1-4.*

The State Intellectual Property Office of the People's Republic of China Application Serial No. 201410350753.5, Office Action dated Dec. 28, 2015, 6 pages.

* cited by examiner

VEHICLE CONTROL DEVICE AND METHOD

CROSS-REFERENCE TO RELATED APPLICATIONS

Pursuant to 35 U.S.C. §119(a), this application claims the benefit of earlier filing date and right of priority to Korean Patent Application No. 10-2013-0086238, filed on Jul. 22, 2013, the contents of which are all hereby incorporated by reference herein in its entirety.

BACKGROUND

The present disclosure relates to a vehicle control device and method, and particularly, to a control device and method.

A plurality of electric control units (ECUs) having microcontrollers are installed in a vehicle. Debugging and calibration of internal system variables are required to develop ECUs.

In order to calibrate a conventional ECU in a vehicle, a laptop computer is directly connected to a control area network (CAN) communication line of the vehicle through a cable and environment variables are updated.

FIG. 1 is a block diagram illustrating a conventional communication system between a vehicle and an external device.

Referring to FIG. 1, a CAN communication module 30 is added for communication between a vehicle 10 and a monitoring/control device 20. The vehicle 10 includes an on board diagnostics (OBD) 11 for diagnosing a state of the vehicle, wherein the OBD transmits, to the monitoring/control device, result data obtained through CAN communication with function units in the vehicle. Furthermore, in order to transmit control data for environment variables from the monitoring/control device, the data should be converted into a format compatible with the CAN communication through the CAN communication module.

In general, the OBD 11 is connected to the monitoring/control device such as a computer or a laptop using the CAN-module-installed interface 30 so as to transfer environment variables for calibrating an ECU. Thereafter, the monitoring/control device updates the environment variables of the ECU using an ECU calibration application program.

According to the above-mentioned system, the OBD 11 should be connected to the monitoring/control device 30 by wire and an additional data conversion device is required, causing spatial limitation and additional cost.

SUMMARY

Embodiments provide a system for calibrating an existing electronic unit for a vehicle, and a mobile-device-based vehicle control device and method for overcoming environmental limitations.

Embodiments provide a mobile-device-based vehicle control device and method for enabling a user to easily perform data transmission and control for calibrating a state of a vehicle.

Embodiments provide a mobile-device-based vehicle control device and method for enabling a user to control a vehicle state using various devices instead of limited monitoring/control devices.

In one embodiment, a vehicle control method includes: collecting data in a first communication data format from at least one electronic unit in a vehicle; converting the data collected in the first communication data format into a second communication data format in order to be transmitted to a pre-connected destination; transmitting the converted data to the destination; receiving, from the destination, control data of the second communication data format corresponding to the transmitted data; converting the control data of the second communication data format into the first communication data format; and outputting the control data of the first communication data format to a corresponding electronic unit.

The details of one or more embodiments are set forth in the accompanying drawings and the description below. Other features will be apparent from the description and drawings, and from the claims.

DETAILED DESCRIPTION OF THE EMBODIMENTS

Figure 1:
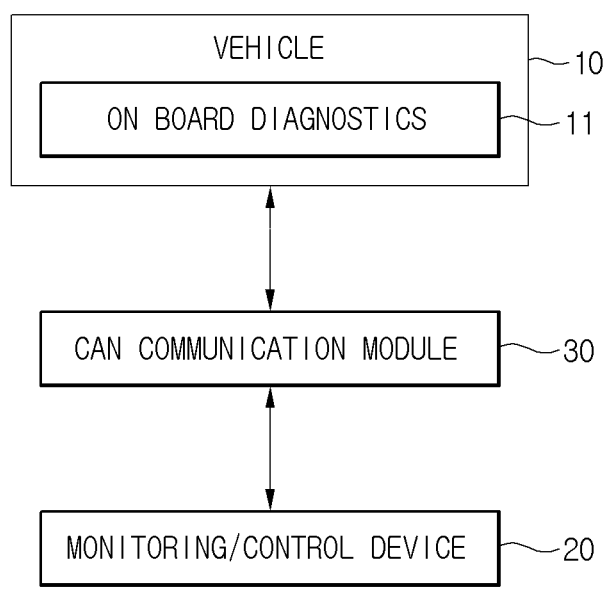
FIG. 1 is a block diagram illustrating a conventional communication system between a vehicle and an external device.

It should be understood that the terms used herein should not be construed as being limited to general and dictionary meanings, but should be interpreted based on the meanings and concepts corresponding to technical aspects of embodiments, considering that inventors may define terms appropriately to describe the embodiments.

Therefore, it should be understood that the embodiments described herein and the configurations illustrated in the drawings are merely preferred examples and do not entirely represent the technical aspects of the embodiments, and thus, various alternative equivalents or modifications could be made at the filing date.

Figure 2:
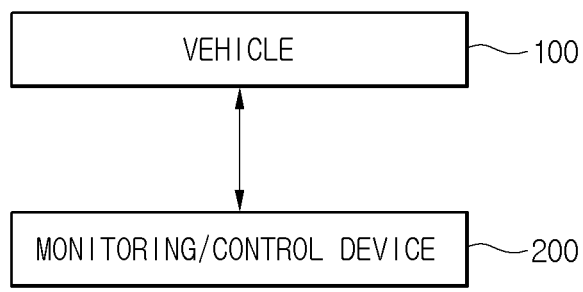
FIG. 2 is a block diagram illustrating a vehicle control system according to an embodiment.

FIG. 2 is a block diagram illustrating a vehicle control system according to an embodiment.

Referring to FIG. 2, the vehicle control system according to the embodiment does not include an additional communication module, but a vehicle 100 may be directly connected to and communicate with a monitoring/control device 200 that acquires data from the vehicle and generates and transmits control data based on the acquired data.

Figure 3:
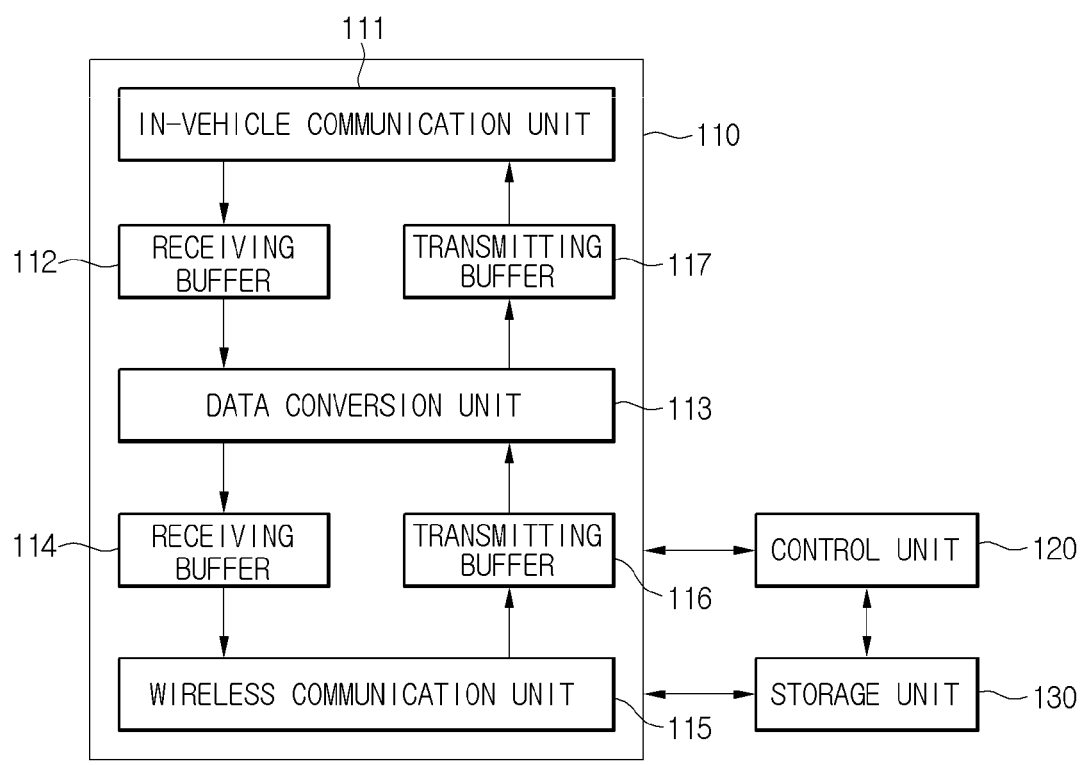
FIG. 3 is a block diagram illustrating a communication unit in the vehicle according to the embodiment.

FIG. 3 is a block diagram illustrating a communication unit in the vehicle according to the embodiment.

Referring to FIG. 3, the communication unit in the vehicle according to the embodiment includes first and second transmitting buffers 116 and 117, first and second receiving buffers 112 and 114, a data conversion unit 113, and a wireless communication unit 115.

The in-vehicle communication unit 111, which is a communication unit for communication between electronic units of the vehicle, may include a CAN communication module. Therefore, a format of data obtained from the in-vehicle communication unit 111 may be a CAN communication data format.

The first receiving buffer 112 may temporarily store the data obtained from the in-vehicle communication unit 111 before the data is output to the data conversion unit 113 so as to be converted into a wireless communication data format.

The data conversion unit 113 may convert the CAN-communication-format data received from the first receiving buffer 112 or directly received from the in-vehicle communication unit 111 into the wireless communication data format so as to transmit the CAN-communication-format data to an external monitoring/control device. Furthermore, the data conversion unit 113 may convert vehicle control data of the wireless communication data format received from the external monitoring/control device into the CAN communication data format so as to transmit a control signal based on the control data to a corresponding electronic unit.

The second receiving buffer 114 may temporarily store the data that has been converted from the CAN communication data format into the wireless communication data format in the data conversion unit 113, and may output the stored data to the wireless communication unit 115 after a lapse of a predetermined time or in response to a control signal.

The wireless communication unit 115 may transmit, to a destination preset by a user, the wireless-communication-format data temporarily stored in the first receiving buffer 114 or obtained in the data conversion unit 113. The destination may be the monitoring/control device 200 that may be a wireless terminal device such as a user mobile terminal. Furthermore, the wireless communication unit 115 may receive control data of the wireless communication data format from the monitoring/control device 200 of the user.

The first transmitting buffer 116 temporarily stores control data of the wireless communication format received through the wireless communication unit 115. The first transmitting buffer 116 may output the control data to the data conversion unit 113 after a lapse of a predetermined period of time or in response to a control signal.

The second transmitting buffer 117 may temporarily store the control data converted into the CAN communication data format in the data conversion unit 113, and may output the control data to the in-vehicle communication unit 111 after a lapse of a predetermined period of time or in response to a control signal. Since a maximum size of data for CAN communication is 8 bytes, the length of the wireless communication data is divided by 8 bytes so as to be transmitted. Therefore, the second transmitting buffer 117 divides the control data of the CAN communication data format output through the data conversion unit 113.

A control unit 120 generates and outputs a control signal for acquiring operation data and state data generated in a plurality of electronic units in the vehicle, at a predetermined time or in real time. Furthermore, the control unit 120 may obtain check and error information about a communication state of a communication unit 110. Furthermore, the control unit 120 may check information on the electronic units in the vehicle and may check monitoring/control devices which are external devices connected through the communication unit 110.

The storage unit 130 may store data generated by the electronic units in the vehicle and control data received from the external devices. The storage unit 130 may store information on the electronic units in the vehicle and reference data. Furthermore, the storage unit 130 may store information on the monitoring/control devices connected through the communication unit 110.

The vehicle may further include a user interface for inputting a user control signal and a display unit for displaying state information of the vehicle.

Figure 4:
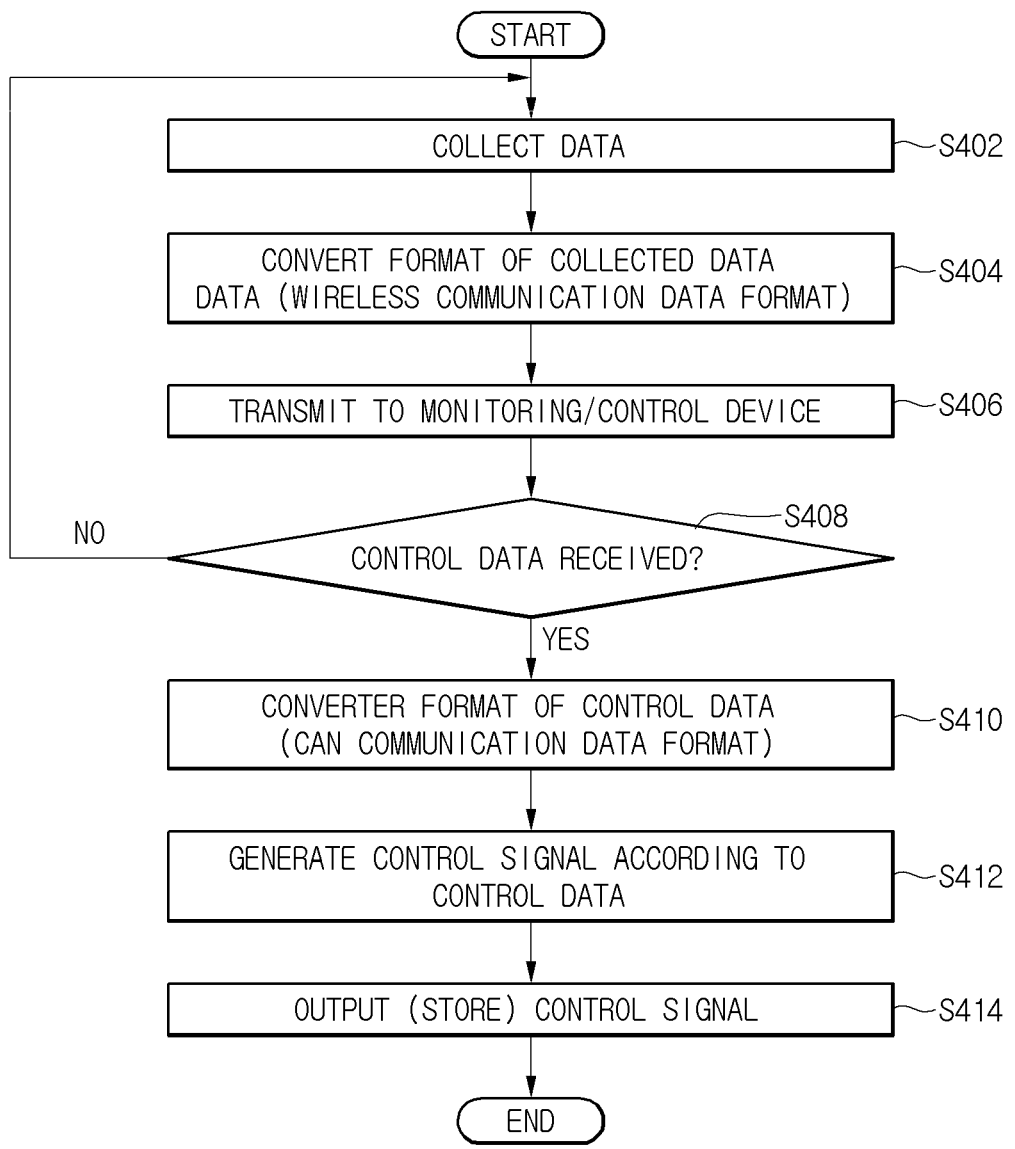
FIG. 4 is a flowchart illustrating a method of controlling a vehicle according to an embodiment.

FIG. 4 is a flowchart illustrating a method of controlling a vehicle according to an embodiment.

Referring to FIG. 4, the control unit 120 may collect data including state information of each electronic unit through the in-vehicle communication unit 111 of the communication unit 110 (operation S402).

The control unit 120 controls the first receiving buffer 112 so that the data collected through the in-vehicle communication unit 111 is temporarily stored in the first receiving buffer 112, and controls the data conversion unit 113 so that the temporarily stored data is converted into a data format so as to be transmitted to an external monitoring/control device.

The data conversion unit 113 may convert the data of the CAN communication data format collected from the electronic units into the wireless communication data format (operation S404).

The data of the wireless communication data format obtained through the conversion may be temporarily stored in the second receiving buffer 114 and may be transmitted to a preset monitoring/control device through the wireless communication unit 115 after a lapse of a predetermined time or in response to a control signal of the control unit 120.

The control unit 120 may continuously monitor whether control data is received from the preset monitoring/control device that has transmitted the data of the electronic units (operation S408).

When the control unit 120 detects the control data received from a monitoring/control device, the control device 120 may check information of the monitoring/control device stored in the storage unit 130.

In the case where the monitoring/control device that has transmitted the control data is the preset monitoring/control device as a result of checking the information of the monitoring/control device, the control unit 120 may temporarily store the received data of the wireless communication data format in the second receiving buffer 114. The temporarily stored control data is converted into the CAN communication data format so as to be transmitted to the electronic units in the vehicle (operation S410).

The control unit 120 may generate a control signal for controlling a corresponding electronic unit on the basis of the data obtained through the conversion (operation S412).

The control unit 120 may allow the generated control signal to be transmitted to each electronic unit and stored in the storage unit 130. Here, in order to transmit the control signal to each electronic unit, the control unit 120 may divide the control signal by 8 bytes that is a maximum size of the CAN communication data format.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for a vehicle control system, the method comprising:
   collecting, via a communication unit in the vehicle, data in a first communication data format from any of a plurality of electronic units located in the vehicle, wherein the data comprises operational and state data of an electronic unit among the plurality of electronic units;
   storing the collected data in the first communication data format in a first receiving buffer memory;
   converting the data stored in the first communication data format into a second communication data format in order to be wireless transmitted to a device that is physically external to the vehicle;
   storing the converted data in the second communication data format in a second receiving buffer memory;

wirelessly transmitting, via a wireless communication unit in the vehicle, the stored data in the second receiving buffer memory to the device;

receiving, via the wireless communication unit, control data in the second communication data format from the device, wherein the control data corresponds to the stored data that was wirelessly transmitted;

storing the received control data in the second communication data format in a first transmitting buffer memory;

converting the received control data in the second communication data format into the first communication data format by dividing the received control data into plural data each having a communication size that is a maximum communication size of the first communication data format;

storing the plural data comprising the converted control data in the first communication data format in a second transmitting buffer memory;

outputting the plural data comprising the converted control data in the first communication data format that is stored in the second transmitting buffer memory to the communication unit; and communicating, via the communication unit in the vehicle, the plural data in the first communication data format to the electronic unit within the vehicle.

2. The vehicle control method according to claim 1, wherein the first communication data format is a control area network (CAN) communication data format, and the second communication data format is a wireless communication data format.

3. The vehicle control method according to claim 1, wherein the maximum communication size of the first communication data format is 8 bytes.

4. The vehicle control method according to claim 1, further comprising:
checking information of the device when a control data reception request is received from the device; and
converting the control data received from the device into the second communication data format when the information of the device matches preset destination information.

5. The vehicle control method according to claim 4, wherein the control data received from the device is temporarily stored while the information of the device is checked.

6. The vehicle control method according to claim 5, wherein, when the checking the information of the device is completed, the temporarily stored control data is converted into the second communication data format.

7. A vehicle control system for a vehicle, the system comprising:
a communication unit configured to collect data in a first communication data format from any of a plurality of electronic units located in the vehicle, wherein the data comprises operational and state data of an electronic unit among the plurality of electronic units;
a first receiving buffer memory;
a second receiving buffer memory;
a first transmitting buffer memory;
a second transmitting buffer memory;
a data conversion unit;
a wireless communication unit; and
a controller configured to:
control the data conversion unit to convert the data stored in the first communication data format into a second communication data format in order to be wirelessly transmitted to a device that is physically external to the vehicle;
store the converted data in the second communication data format in the second receiving buffer memory;
wirelessly transmit, via the wireless communication unit, the stored data in the second receiving buffer memory to the device;
receive, via the wireless communication unit, control data in the second communication data format from the device, wherein the control data corresponds to the stored data that was wirelessly transmitted;
store the received control data in the second communication data format in the first transmitting buffer memory;
convert the control data in the second communication data format into the first communication data format by dividing the received control data into plural data each having a communication size that is a maximum communication size of the first communication data format;
store the plural data comprising the converted control data in the first communication data format in the second transmitting buffer memory;
output the plural data comprising the converted control data in the first communication data format that is stored in the second transmitting buffer memory to the communication unit; and
communicate, via the communication unit, the plural data in the first communication data format to the electronic unit within the vehicle.

8. The system of claim 7, wherein the first communication data format is a control area network (CAN) communication data format, and the second communication data format is a wireless communication data format.

9. The system of claim 7, wherein the maximum communication size of the first communication data format is 8 bytes.

10. The system of claim 7, wherein the controller is further configured to:
check information of the device when a control data reception request is received from the device; and
convert the control data received from the device into the second communication data format when the information of the device matches preset destination information.

11. The system of claim 10, wherein the control data received from the device is temporarily stored while the information of the device is checked.

12. The system of claim 11, wherein when the checking the information of the device is completed, the temporarily stored control data is converted into the second communication data format.

* * * * *